Feb. 16, 1960 W. JAQUIERY 2,925,119
MACHINE FOR HEAT SEALING PLASTIC MATERIAL
Filed Aug. 8, 1957 3 Sheets-Sheet 3

INVENTOR
WARREN JAQUIERY
BY Andrus, Sceales & Stark
ATTORNEY

United States Patent Office 2,925,119
Patented Feb. 16, 1960

2,925,119
MACHINE FOR HEAT SEALING PLASTIC MATERIAL

Warren Jaquiery, Watertown, Conn., assignor to Chippewa Plastics Incorporated, Chippewa Falls, Wis., a corporation of Wisconsin Application August 8, 1957, Serial No. 677,151

6 Claims. (Cl. 154—42)

This invention relates to a machine for heat sealing multi-layer thermoplastic stock, which finds particular utility in fabricating bags and the like from tubular, flexible plastic stock.

Heat sealing is commonly used to process thermoplastic stock into seamless bags or the like. Some of these plastic materials are difficult to handle and fabricate satisfactorily by conventional means because of tendencies to stick to their clamps, to deform readily when heated and because of their definite melting points.

The seals so formed are often torn, stretched or otherwise damaged which results in uneven seams of non-uniform strength. One of the shortcomings of many prior art devices which causes poor seals is the fact that the web or stock is sealed while under tension. If sufficient time is not allowed for the seal to cool, it will be distorted or damaged when unclamped. Such cooling periods, of course, reduce the output of such a machine. Heat transfer problems in the clamps are also prevalent where clamping devices are necessary to hold the tensioned stock adjacent the seal being formed. The heat must be dissipated from the clamp so the stock is not softened thereby.

According to the present invention, a machine is provided which eliminates the above difficulties. A seal is formed in thermoplastic, flexible material while the latter is completely relaxed and under no tension whatsoever. Furthermore, after the seal is made, no tension is placed on the seal and no delay is necessary in the operation of the machine to permit the seal to cool.

The invention provides a machine that has its various parts so positioned, relative to one another, that the material is presented to the sealing means in such a manner that the finished material containing the seal is free to drop onto a stacking device. This arrangement is particularly desirable where relatively heavy material is being sealed and, because of its mass, requires considerable time to cool to regain its strength. In this latter respect, the invention provides novel stacking means for a machine of this type.

The machine of the invention forms a seal in multi-layer, flexible, thermoplastic material whereby the free end of the web to be sealed is positioned in a completely relaxed position and under no tension, the seal then made to the free end. The tube is then severed to form an open end remote from the seal and the finished article is then dropped freely onto a stacking device.

These and other objects and advantages will appear hereinafter as this disclosure progresses.

This application is a continuation-in-part of my co-pending U.S. application Serial Number 611,988, filed September 25, 1956, now abandoned, entitiled, "Bag Forming Machine."

In the accompanying drawing annexed hereto and forming a part of this specification, I have shown the invention embodied in an upright electrically controlled machine, the movable members of which are operated by air under pressure, but it will be understood that the invention may be otherwise embodied and that the drawings are not to be construed as defining or limiting the scope of the invention, the claims appended to this specification being relied upon for that purpose.

In the above mentioned drawings, there has been shown but one embodiment of the invention which is now deemed preferable but it is to be understood that changes and modifications may be made within the scope of the appended claims without departing from the spirit of the invention.

Figure 1:
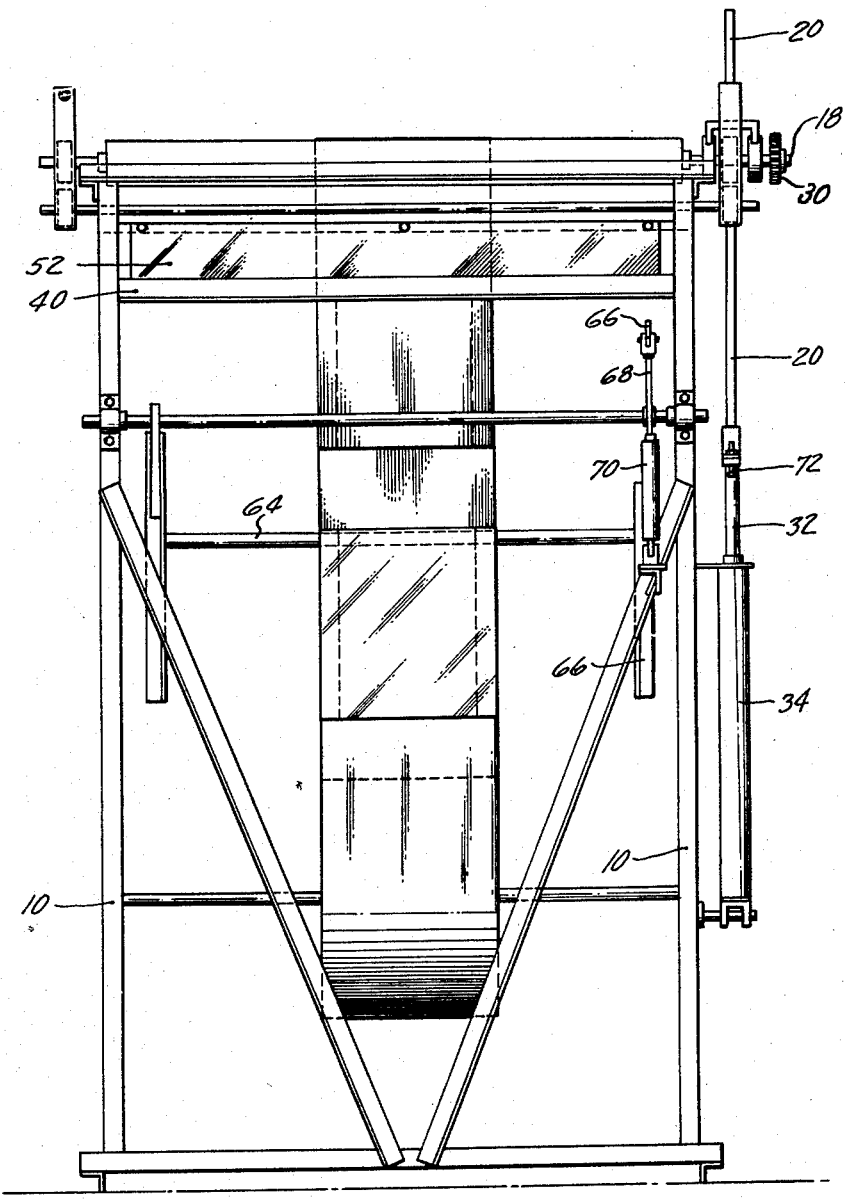
Fig. 1 is a front elevation of a complete machine embodying the invention.
Figure 2:
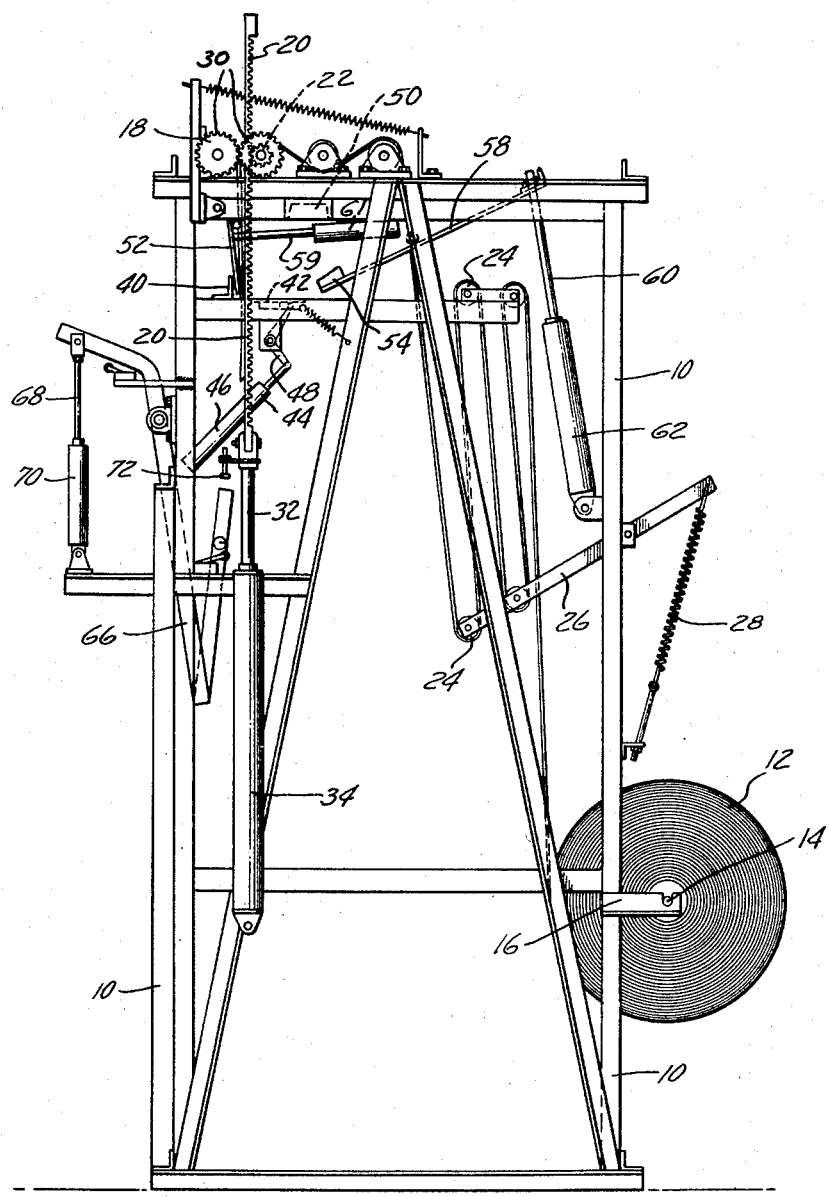
Fig. 2 is a side elevation of the machine shown in Fig. 1.

Referring more in detail to the figures of the drawing, and first to Figs. 1 and 2, it will be seen that the machine includes a frame 10 as shown in the illustrated embodiment of the invention being built up of steel structural members. Supported horizontally on the rear upright members of the frame 10 is a large roll of flexible material 12 from which the bags are to be formed. The roll 12 as shown in Fig. 2 is provided with a central shaft 14 which is supported in suitable bearings provided in bars 16 extending from the frame 10. The roll 12 is made up of flexible impervious and preferably transparent tubing of heat sealing plastic material in flattened or sheet form.

The thermoplastic material is advanced from the roll 12 by feeding rolls 18 predetermined distances which may be varied in accordance with the length of the particular bags being made. As shown in the drawings a vertically movable rack 20 has its teeth in mesh with the teeth of a gear 22 on the shaft of one of the feeding rolls 18. Movement upward of the rack 20 rotates, through its gear connections, the feed rolls 18 and advances the material a predetermined amount determined by movement of the rack. Between the feed rolls 18 and the material roll 12 are a plurality of tensioning rolls over which the bag making material passes. The lower rolls 24 are mounted on a pivoted frame 26 the weight of which maintains the web under a suitable tension. A spring 28, one end of which engages the extended end of one of the arms of the frame 26, enables a portion of the weight of the frame to be taken from the web to reduce the tension on the bag material.

Rotation of the feed rolls 18 is accomplished by means of the vertically movable rack 20 in mesh with gear 22 secured to one of the feed roll shafts. Also connected to the feed rolls 18 are intermeshing gears 30. Downward movement of the rack 20 rotates the feed rolls 18 to advance the web a predetermined length dependent on the length of the bags being made. Movement vertically of the rack 20 may be accomplished by a piston 32 attached to the lower end of the rack 20 and operating within a cylinder 34. By admitting air under pressure to the opposite ends of this cylinder the rack 20 may be moved up or down. The gear 22 meshing with the rack 20 is connected to its feed roll shaft by means of ratchet means so that upward movement of the rack 20 can take place without retrograde rotation of the feed rolls 18.

From the feed rolls 18 the stock material passes freely downward adjacent to and past a fixed blade 40. Mounted adjacent the fixed blade is a knife or blade 42 movable toward and from the fixed blade 40 to transversely cut the web. The blade 42 may be moved to cutting position and back by a piston 44 movable within a cylinder 46 by air under pressure admitted to opposite ends of the cylinder 46. At the upper end of the piston is a bell crank lever 48 to one arm of which the piston 44 is attached. The opposite arm of the bell crank 48 is operatively connected to the movable blade 42.

When a bag length has been severed from the web by blade 42 the depending free end of the web below the feed rolls 18 is moved upward against an electrically heated member 50 extending horizontally the entire width of the web. This movement of the web is effected by a pivotally movable plate 52. While the end of the web is held in this position a pressure bar 54 is moved upward to engage and force the free end of the web against the heated member 50 to effectively seal the end of the bag.

To move the bar 54 upward a lever 58 is attached thereto pivoted at an intermediate point to a portion of the machine frame. A piston 60, operating within a cylinder 62, has the upper end of its piston rod attached to the extended end of the lever 58. Movement of the piston within its cylinder therefore will force the bar and web against the heated member 50.

Figure 3:
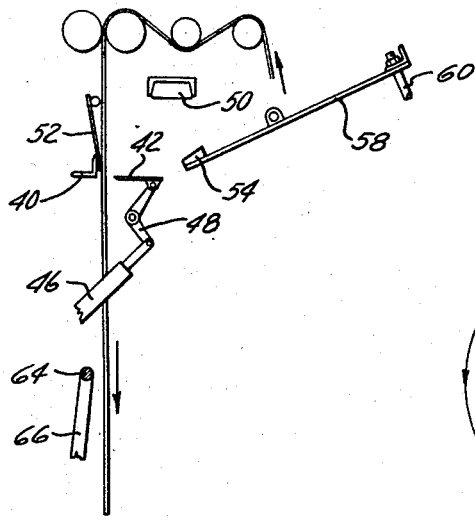
Figs. 3 to 6 are diagrammatic views showing the principal movable parts in successive operative positions during the cycle of operation of the machine.
Figure 4:
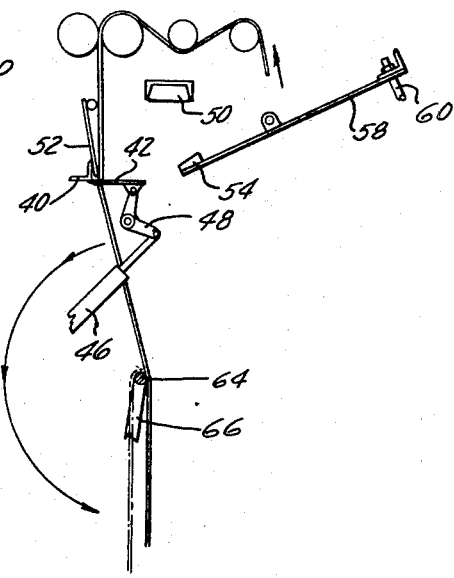
Figure 5:
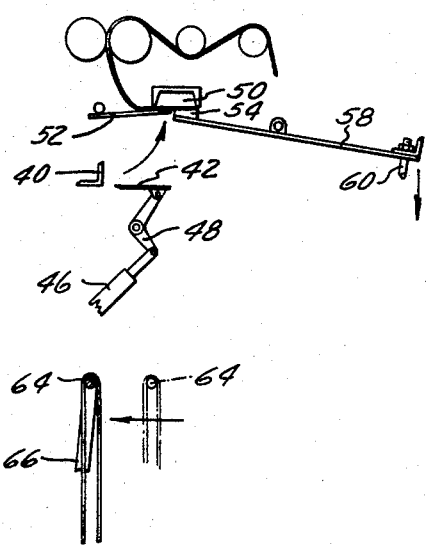
Figure 6:
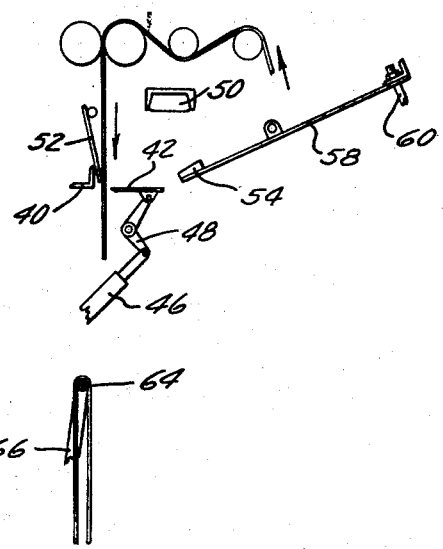

After the bags have been individually severed from the web by blade 42 it is desirable to stack them one above the other in folded condition as indicated in Fig. 1. For this purpose a horizontal rod 64 is moved substantially horizontally to a position directly below the bags as shown in Fig. 4 so that a bag when severed by the cutting blades from the web will fall by gravity over the rod 64. In its retracted position of the rod 64 as shown in Fig. 3 in full lines the web before the bag has been severed may extend below the horizontal position of the rod. Movement of the rod 64 toward its advanced position so positions the web that as soon as a bag is severed its upper end drops down and over the opposite side of the bar. Movement of the bar 64 is effected by linkage 66 actuated by movement of a piston 68 within a cylinder 70.

To cause operation of the above described mechanism in proper sequence admission of air under pressure successively to the opposite ends of the cylinders 34, 46, 62 and 70 may be controlled by solenoid operated valves. By individually energizing the solenoids air is admitted from a suitable source to the end of cylinders one after the other. The solenoids (not shown) may be included within electric circuits energized by small switches actuated when a piston reaches the end of its predetermined travel. That is, when piston 68 moves to its lowest position a contactor 72 closes a switch in the circuit to energize the circuit to the solenoid opening the valve to move the blade 42 to cut the web. This is effected by air being admitted to one end of cylinder 46 to move the piston 44 connected to the blade 42. Similarly the piston 44 when it completes its movement to sever the web energizes the solenoid to move a piston 59 into its cylinder 61 and raise the severed end of the web against the heated member 50. This movement of piston 59 closes the switch to energize another solenoid so that piston 60 is moved toward its cylinder to press the web end firmly against the heated member 50. On completion of this movement of piston 60 by closing a similar switch, the rod 64 is moved forward to its bag folding position.

As the circuits for these switches and the solenoid operated valves are or may be of standard form, further description is not thought to be necessary.

By means of this invention there has been provided a machine for sealing multi-layers of thermoplastic material, the seal being formed when the material is under no tension whatsoever, but rather is completely relaxed. Neither is the seal placed under any tension after it is formed but is completely unrestricted and free to fall by gravity. As the material is then cut free from the web, the stacking means is also acting to position it for its free fall to a stacked position. This is all accomplished without disturbing the seal which may still be in a soft and deformable condition.

Various modes of carrying out the invention are contemplated as being within the scope of the following claims particularly pointing out and distinctly claiming the subject matter which is regarded as the invention.

I claim:

1. In apparatus for making bags from tubular thermoplastic stock, said stock having a free end, means for feeding said stock downwardly so that it hangs freely, transverse heat-sealing means disposed beneath said feeding means, means for positioning said free end in said sealing means so that it is sealed while under no tension and from which it drops freely after being sealed, and cutting means for cutting said stock a distance spaced from said sealed end after the stack has dropped free of said sealing means to form a bag.

2. In apparatus for making bags from tubular thermoplastic stock, said stock having a free end, means for feeding said stock downwardly so that it hangs freely, transverse heat-sealing means disposed beneath said feeding means and spaced horizontally from the path of said stock, means for moving said free end laterally into engagement with said sealing means so that it is sealed while under no tension and from which it drops freely to continue its downward movement after being sealed, cutting means disposed beneath said feeding means and in the path of said stock for cutting said stock a distance from said sealed end to form a bag which then falls freely by gravity, and stacking means movable into contact with said stock after sealing but prior to the latter being cut and with said stacking means being constructed so that the freely falling bag fold itself on said stacking means.

3. A bag forming machine comprising, a frame adapted to support a web of flexible thermoplastic tubular material having a free end, feeding means for advancing said material predetermined distances downwardly, positioning means for said free end and disposed beneath said feeding means and constructed to move said free end upwardly to a sealing position, shiftable sealing means disposed laterally from the downward path of said material and movable to a sealing position to seal said free end and then move to a non-sealing position so that the sealed end is free to fall by gravity, and cutting means to sever said web at a point spaced from said sealed end after the material has dropped free of said sealing means to thereby form a bag.

4. A bag forming machine comprising, a frame adapted to support a web of flexible thermoplastic tubular material having a free end, feeding means for advancing said material predetermined distances, positioning means for said free end whereby the latter is moved upwardly to a sealing position, shiftable sealing means adapted to move to a sealing position to seal said free end and then move to a non-sealing position whereby the sealed end is free to fall by gravity, cutting means to sever said web at a point spaced from said sealed end to thereby form a bag which is free to fall by gravity, and moveable stacking means operably responsive to said shiftable sealing means to contact said web after sealing but before said cutting means severs said web to form said bag and with the said stacking means being constructed so that said bag folds itself as it falls onto said stacking means.

5. In apparatus for processing a continuous roll of tubular thermoplastic stock, means to feed said stock from a roll so that it hangs downwardly freely, means to cut the hanging stock transversely of its feed direction to provide a free transverse edge on the stock being fed, means to shift said free edge laterally upwardly, sealing means disposed in the path of said upwardly moving edge and adapted to seal said edge, said sealing means being operably constructed to subsequently release said edge and allow it to fall freely downwardly for subsequent cutting of the stock a distance from said edge, and stacking means disposed in the path of the downwardly falling cut stock to foldingly receive the latter.

6. In apparatus for processing a continuous roll of thermoplastic stock and having sealing means for sealing an edge of the stock, means to feed said stock so that the latter hangs downwardly freely, cutting means engageable with the hanging stock to cut the latter transversely of its feed direction to provide a free transverse edge on the stock being fed, first shifting means operable in resopnse to the action of said cutting means to move said free edge laterally upwardly, second shifting means operable in response to the action of said first shifting means to press the upwardly moving edge against said sealing means, said second shifting means being constructed to subsequently release said edge and allow it to fall freely downwardly for subsequent cutting of the stock a distance from said edge, and stacking means movable into the path of the downwardly falling cut stock in response to the operation of said second shifting means to foldingly receive the said cut stock, the construction being such that the operation of said cutting means is initiated by said stacking means.

References Cited in the file of this patent
UNITED STATES PATENTS

| | | |
|---|---|---|
| 2,467,879 | Billeb | Apr. 19, 1949 |
| 2,652,879 | Keller et al. | Sept. 22, 1953 |
| 2,679,280 | Marsh | May 25, 1954 |
| 2,698,046 | Finke | Dec. 28, 1954 |
| 2,726,706 | Hakomaki | Dec. 13, 1955 |
| 2,780,275 | Rusch et al. | Feb. 5, 1957 |
| 2,796,913 | Fener et al. | June 25, 1957 |